Patented Mar. 28, 1944

2,344,981

UNITED STATES PATENT OFFICE 2,344,981

DYESTUFFS OF THE ANTHRAQUINONE SERIES

William Dettwyler, Pitman, N. J., assignor to E. I. du Pont de Nemours & Company, Wilmington, Del., a corporation of Delaware No Drawing. Application March 25, 1941, Serial No. 385,145

3 Claims. (Cl. 260—316)

This invention relates to the preparation of new dyestuffs of the anthraquinone series and more particularly to the preparation of dyestuffs of the dianthrimide carbazole type which carry on one of the anthraquinone molecules the benz-thioxanthone nucleus and which carries on the second anthraquinone molecule a benzoylamino group attached in an alpha position. These new compounds have the general formula

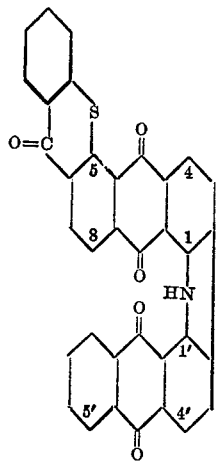

in which there is present in one of the positions 4' and 5' a benzacylamino group of the class consisting of benzoylamino, halogen substituted benzoylamino and methyl substituted benzoylamino groups.

It is an object of the invention to produce new dyestuffs of the anthraquinone vat dye class which dye is desirable orange to red shades and which exhibit good fastness properties.

I have found that orange to red dyes can be produced by condensing 5-amino-2,1(S) anthraquinone-thioxanthone with 1-chloro-anthraquinones which carry in one of the positions 4 and 5 a benzoylamino group, and ring closing the resulting anthrimide with aluminum chloride in nitrobenzene or in pyridine. These dyestuffs are preferably subjected to a further treatment with an oxidizing agent such as sodium dichromate according to the usual practice in preparing anthrimide carbazoles to be used as vat dyestuffs.

The following examples are given to illustrate the invention. The parts used are by weight.

Example 1

Thirty-six parts 5-amino-2:1(S)-anthraquinone-thioxanthone, 36 parts 1-benzoylamino-4-chloro-anthraquinone, 10 parts soda ash and 0.5 part cupric carbonate are heated in 500 parts nitrobenzene at 200° C. for 2 hours. After cooling to room temperature, the crystalline anthrimide is filtered off and washed with nitrobenzene. The cake is freed from the solvent by steam distillation. The new anthrimide is a dark powder, soluble in concentrated sulfuric acid with a brown color and has very little affinity for the cotton fiber.

Example 2

126 parts freshly ground aluminum chloride are dissolved in 330 parts nitrobenzene and the solution cooled to 25° C. 46 parts of the anthrimide of Example 1 are then added and the resulting solution heated to 50°, which temperature is maintained for one hour. The brown solution changes to violet. It is then poured into 1000 parts of ice and water and stirred until the aluminum chloride complex is decomposed. The nitrobenzene is then steam distilled off and the crude color filtered from aluminum salt. It is a dark powder soluble in sulfuric acid with a red color. Upon pasting from sulfuric acid a red-brown paste is obtained, which dyes cotton from a violet vat in strong red shades of excellent fastness properties.

Example 3

Thirty-six parts 5-amino-2:1-(S)-anthraquinone-thioxanthone, 36 parts 1-benzoylamino-5-chloro-anthraquinone, 10 parts soda ash and 0.5 part of cupric carbonate are heated in 500 parts nitrobenzene at 200° C. for 3 hours. The anthrimide is isolated as in Example 1. It is a brown color and has no affinity for the fiber.

Into a freshly prepared solution of 150 parts aluminum chloride in 400 parts nitrobenzene are added 49 parts of the above anthrimide. Upon heating to 50° the brown solution changes to violet blue. The heating is continued for one hour, the mass cooled and poured into 1000 parts of ice and water. After stirring for 10 hours the nitrobenzene is steam distilled off and the crude color isolated. It is a brown powder, soluble in concentrated sulfuric acid with a blue color. When converted into a paste by the usual method it dyes cotton from a violet vat in strong orange shades.

The vat colors of the type illustrated above dye from the usual alkaline hydrosulfite vat by either the warm or the cold dyeing method. They exhibit excellent fastness to light and chlorine and show especially good fastness to power laundry. They are suitable not only for dyeing by the usual vat dyeing methods but they may also be employed in printing fabrics by the methods usually employed in the printing of vat dyestuffs.

I claim:

1. The 1,1'-dianthrimide-carbazoles which carry the benzthioxanthone group in the 5(S),6 position, and which carry in one of the positions 4' and 5' a benzacyl-amino group of the class consisting of benzoylamino, halogen substituted benzoylamino and methyl substituted benzoylamino groups, which compounds dye cotton from a violet hydrosulfite bath in orange to red shades of excellent fastness properties.

2. The 1,1'-dianthrimide-carbazole which carries the benzthioxanthone group in the 5(S),6 positions and in the 4'-position the benzoylamino-radical, and which dyes cotton from a violet hydrosulfite vat in red shades of excellent fastness properties.

3. The 1,1'-dianthrimide-carbazole which carries the benzthioxanthone in the 5(S),6 positions and in the 5'-position the benzoylamino radical, and which dyes cotton in orange shades of excellent fastness properties.

WILLIAM DETTWYLER.